United States Patent
Bihday et al.

(10) Patent No.: US 12,479,338 B2
(45) Date of Patent: Nov. 25, 2025

(54) CHILD DETECTION DEVICE FOR A CHILD SAFETY SEAT

(71) Applicant: Cypress Semiconductor Corporation, San Jose, CA (US)

(72) Inventors: Volodymyr Bihday, Lviv (UA); Oleg Kapshii, Lviv (UA); Andriy Maharyta, Lviv (UA); Mykhaylo Krekhovetskyy, Lviv (UA); Marian Muliarchyk, Maheriv (UA); Yaroslav Berko, Zhovkva (UA)

(73) Assignee: Cypress Semiconductor Corporation, San Jose, CA (US)

( * ) Notice: Subject to any disclaimer, the term of this patent is extended or adjusted under 35 U.S.C. 154(b) by 252 days.

(21) Appl. No.: 18/330,268

(22) Filed: Jun. 6, 2023

(65) Prior Publication Data
US 2024/0409008 A1   Dec. 12, 2024

(51) Int. Cl.
G08B 21/24 (2006.01)
B60N 2/00 (2006.01)
B60N 2/26 (2006.01)
B60Q 9/00 (2006.01)
G08B 21/02 (2006.01)

(52) U.S. Cl.
CPC .......... B60N 2/267 (2023.08); B60N 2/0022 (2023.08); B60Q 9/00 (2013.01); G08B 21/0277 (2013.01); *B60N 2210/12* (2023.08)

(58) Field of Classification Search
USPC ......... 340/457, 425.5, 426.1, 429, 430, 506, 340/507, 564
See application file for complete search history.

(56) References Cited

U.S. PATENT DOCUMENTS

| | | | |
|---|---|---|---|
| 6,621,411 B2 * | 9/2003 | McCarthy | E05B 85/12 340/506 |
| 7,635,984 B2 * | 12/2009 | Stanley | B60R 21/01532 324/674 |
| 2004/0064280 A1 * | 4/2004 | Seip | B60H 1/00771 702/103 |
| 2004/0068354 A1 * | 4/2004 | Tabe | B60R 22/48 701/45 |
| 2008/0191856 A1 * | 8/2008 | Hetzenecker | B60R 21/01516 340/457 |
| 2018/0354443 A1 * | 12/2018 | Ebrahimi | G08B 21/0277 |
| 2019/0003877 A1 * | 1/2019 | Aina | G01G 19/12 |
| 2021/0081754 A1 * | 3/2021 | Frolova | G06N 3/04 |

* cited by examiner

*Primary Examiner* — Daniel Previl (57) ABSTRACT

A child detection device for a child safety seat for an automobile according to an example includes a plurality of sensors to be positioned on the child safety seat, wherein the plurality of sensors includes at least one capacitive sensor to generate analog capacitive signals. The child detection device includes a conversion circuit to convert the analog capacitive signals to digital capacitive values. The child detection devices includes a controller to identify movement of an object based on the digital capacitive values, and determine whether a child is positioned in the child safety seat based on the digital capacitive values and the identified movement.

20 Claims, 6 Drawing Sheets

CHILD DETECTION DEVICE FOR A CHILD SAFETY SEAT

BACKGROUND

Sensing of objects within an automobile may involve indirect sensing or direct sensing. Indirect sensing typically involves determining the potential presence of a subject or object inside an automobile based on logic. In contrast, direct sensing typically derives the absolute presence of a human inside the automobile by sensing signs of life, such as heartbeat, respiration, movements, or other signs.

A touch sensor or proximity sensor is an example of technology that is typically used for indirect sensing, and may be used to detect the presence of an object on or near a sensitive area of the sensor. There are a number of different types of such sensors, including resistive sensors, surface acoustic wave sensors, capacitive sensors, inductive sensors, and so forth. The different types of such sensors may detect different types of objects.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

There have been instances of people leaving their parked automobile and forgetting that they have a child secured in a child safety seat within the automobile, which can lead to a dangerous situation for a child. A young child is likely unable to exit a vehicle on his/her own, and is likely to have a low tolerance for high temperatures. Leaving an unattended child in a parked car can lead to heat-stroke and death.

Some automobiles may include a seat belt reminder light activated by a pressure sensor under the automobile seat. Such a pressure sensor is unable to classify objects, such as distinguishing between a person and a backpack, and does not work for a child in a child safety seat. Child safety seats do not typically have any sensitive elements to report child presence and a state of seat belts for the child safety seat.

Sensing of objects within an automobile may involve indirect sensing or direct sensing. Indirect sensing involves determining the potential presence of a subject or object inside an automobile based on logic. Indirect sensing does not typically distinguish between live persons and objects. Examples of indirect sensing include determining presence based on an automobile door opening, pressure sensing, and capacitive sensing. In contrast, direct sensing derives the absolute presence of a human inside the automobile by sensing signs of life, such as heartbeat, respiration, movements, or other signs. Direct sensing may or may not allow categorization and localization of objects. Examples of direct sensing include determining presence based on technologies such as radar, ultrasonic, camera, lidar, infrared, as well as others.

Pressure sensors and carbon dioxide sensors may be used for indirect sensing, but may be unreliable for presence detection involving a child safety seat. A motion sensor may be used for direct sensing, but a sleeping child may be undetectable. An image sensor (2D/3D) may be used for direct sensing, but there are privacy concerns with such systems. WiFi channel state information (CSI) sensing may be used for direct sensing, but such systems involve several nodes and a sleeping child may be undetectable. Radar may be used for direct sensing, but such systems can be expensive.

Some examples disclosed herein are directed to an autonomous presence detection system for a child safety seat that avoids additional wired connections that might otherwise be involved when installing or removing a child safety seat. Some examples involve indirect sensing technologies that are implemented in a manner to be able to perform direct sensing and distinguish between a human (e.g., a child) and non-human objects (e.g., backpack, laptop, etc.). In some examples, the presence detection involves sensing self-capacitance, mutual capacitance, and inductance.

Figure 1:
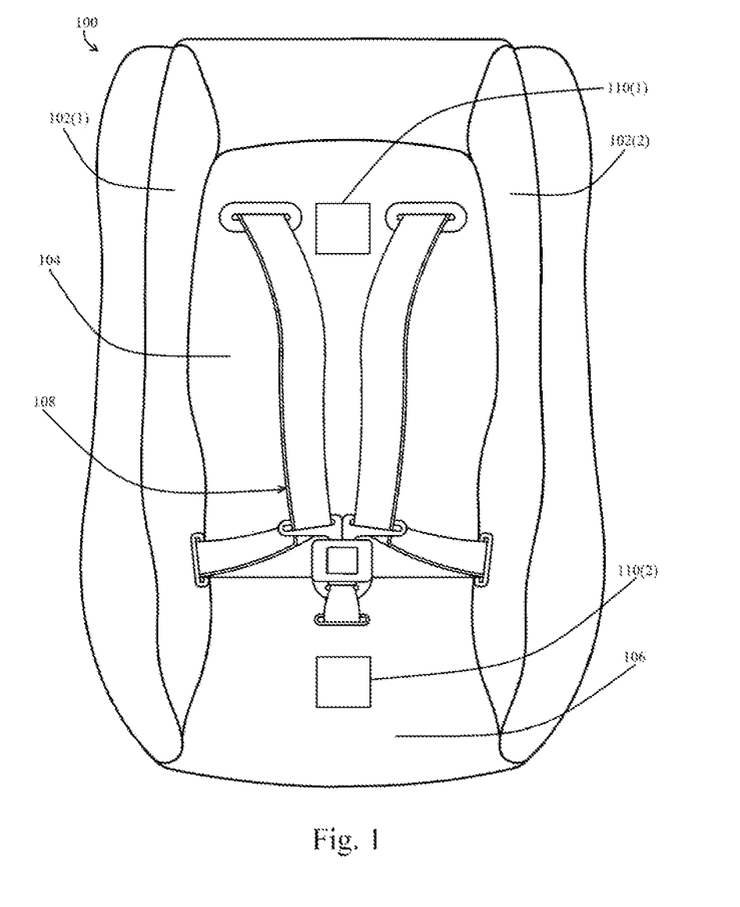
FIG. 1 is a diagram illustrating a front view of a child safety seat with child detection devices according to an example.

FIG. 1 is a diagram illustrating a front view of a child safety seat 100 according to an example. In an example, child safety seat 100 is a portable apparatus that may be positioned on a seat of an automobile to safely restrain a child while driving the automobile, and may be easily removed from the automobile when not in use. Child safety seat 100 includes side restraint portions 102(1) and 102(2) (collectively referred to as side restraint portions 102), backrest portion 104, seating portion 106, harness 108, and child detection devices 110(1) and 110(2) (collectively referred to as child detection devices 110).

Backrest portion 104 extends vertically upward at an angle from seating portion 106 and provides support for a child's back while the child is sitting on seating portion 106. Side restraint portions 102 extend vertically upward from the seating portion 106 along the lateral edges of the backrest portion 104, and help to limit lateral movement of a child within the child safety seat 100. Harness 108 fits over a child's shoulders and waist and is used to safely secure the child within the child safety seat 100. It is noted that FIG. 1 shows one example of a child safety seat, and other examples may have a configuration that is different than that shown in FIG. 1.

Child safety seat 100 includes child detection devices 110 to detect when a child is present in the child safety seat 100. In the illustrated example, child detection device 110(1) is positioned on the backrest portion 104, and child detection device 110(2) is positioned on the seating portion 106. Although two child detection devices 110 are shown in FIG.

1, in other examples, a single child detection device 110 or more than two child detection devices 100 may be used. The positioning of the child detection devices 110 may also vary from that shown in FIG. 1. Child detection devices 110 may be positioned anywhere on child safety seat 100 that might come in close proximity to a child while the child is seated in the child safety seat 100.

The child detection devices 110 may be embedded in the child safety seat 100 during manufacture, or may be sold after market and added to the child safety seat 100, such as via an add-on mat or cushion that may be placed on the child safety seat 100. In an example, the child detection devices 110 include capacitive and inductive sensors to generate signals indicative of whether a child is present in the child safety seat 100.

Figure 2:
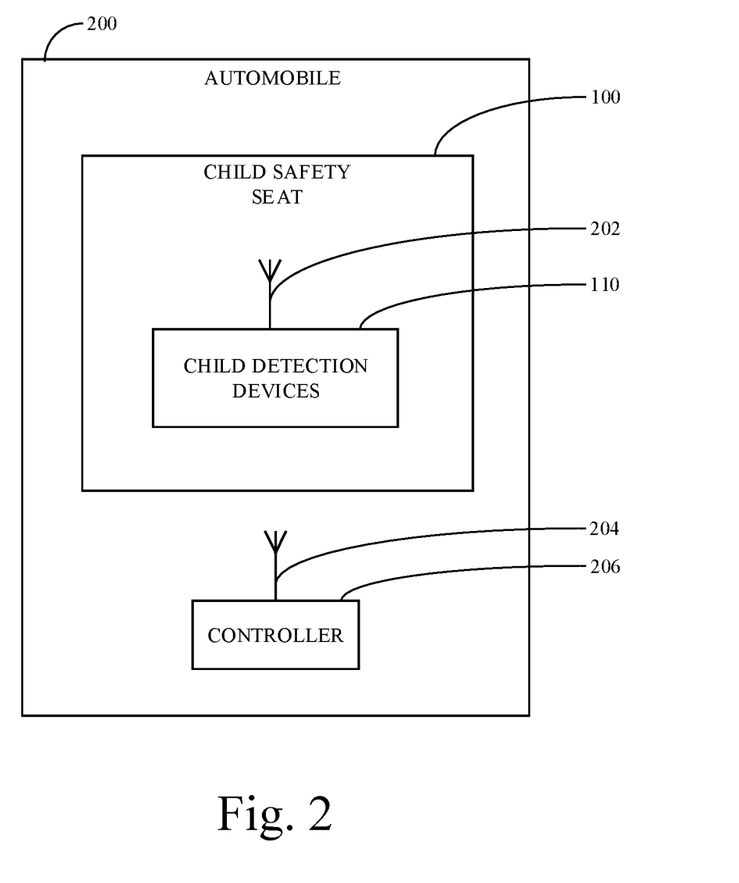
FIG. 2 is a block diagram illustrating elements of an automobile including a child safety seat with child detection devices according to an example.

FIG. 2 is a block diagram illustrating elements of an automobile 200 including a child safety seat 100 with child detection devices 110 according to an example. In an example, each of the child detection devices 110 includes an antenna 202 for wireless communications. Automobile 200 includes controller 206 with an antenna 204 for wireless communications. In an example, controller 206 causes audible and/or visual notifications to be provided to an occupant of automobile 200, such as via speakers or a display of the automobile 200. Child detection devices 110 and controller 206 may wirelessly communicate with each other via antennas 202 and 204.

In operation according to an example, when child detection devices 110 detect that a child is present in the child safety seat 100, the child detection devices 110 wirelessly transmit a child detected signal via antenna 202 that indicates that a child is present in the child safety seat 100. The child detected signal may be continually transmitted from the child detection devices 110 as long as the child continues to be detected in the child safety seat 100, or the child detected signal may be transmitted in response to certain events, such as the automobile 200 being turned off, or a door of the automobile 200 being opened. Controller 206 wirelessly receives the child detected signals from child detection devices 110 via the antenna 204, and in response, causes an audible and/or visual notification to be provided to an occupant of automobile 200, such as via speakers or a display of the automobile 200, to indicate to the occupant (e.g., driver) that a child is present in the child safety seat 100.

Figure 3:
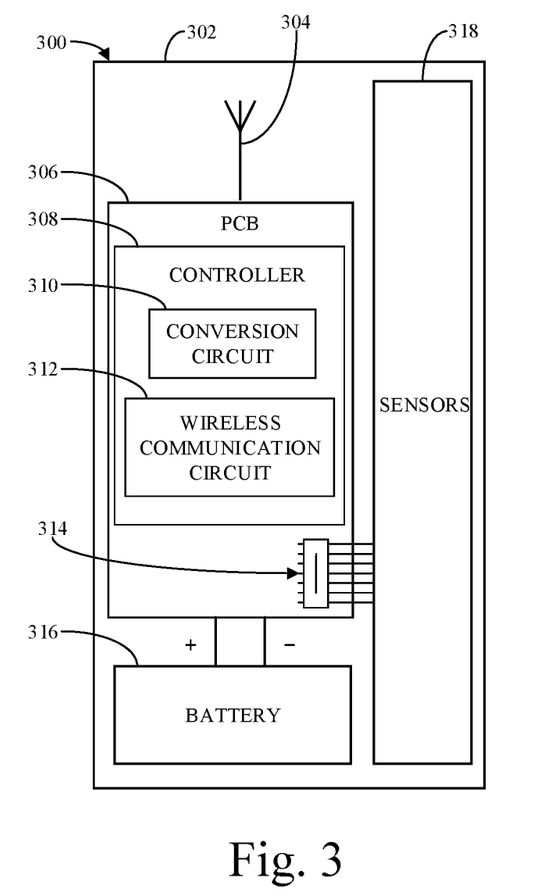
FIG. 3 is a diagram illustrating a child detection device for a child safety seat according to an example.

FIG. 3 is a diagram illustrating elements of a child detection device 300 for a child safety seat according to an example. Child detection device 300 is an example implementation of each of the child detection devices 110 (FIGS. 1 and 2). Child detection device 300 includes antenna 304, printed circuit board (PCB) 306, battery 316, and sensors 318, which are all included inside of a container 302. In other examples, one or more of the sensors 318 may be positioned outside of container 302 and coupled to interconnect circuitry 314 via a cable or other communication link. In this way, one or more of the sensors 318 may be positioned, for example, on the seating portion or the backrest portion of a child safety seat, while the container 302 is positioned in a different location, such as attached to the bottom or the back of the child safety seat.

Printed circuit board 306 includes controller 308. In an example, controller 308 is a programmable system on a chip (PSoC). Controller 308 includes a conversion circuit 310 and a wireless communication circuit 312. In an example, conversion circuit 310 includes analog to digital conversion circuitry to convert analog signals from sensors 318 to corresponding digital values that are processed by controller 308. Wireless communication circuit 312 wirelessly sends and receives communications via antenna 304. In an example, wireless communication circuit 312 is a Bluetooth Low Energy (BLE) circuit. PCB 306 is electrically coupled to sensors 318 via interconnect circuitry 314. Battery 316 provides power to the circuitry on PCB 306.

In an example, sensors 318 include at least one capacitive sensor and at least one inductive sensor. The at least one capacitive sensor continually senses a capacitance, and provides analog signals representative of the sensed capacitance to conversion circuit 310 via interconnect circuitry 314. Conversion circuit 310 converts the analog signals representative of the sensed capacitance to digital values that are provided to controller 308.

The at least one inductive sensor in sensors 318 continually senses an inductance, and provides analog signals representative of the sensed inductance to conversion circuit 310 via interconnect circuitry 314. Conversion circuit 310 converts the analog signals representative of the sensed inductance to digital values that are provided to controller 308. In an example, child detection device 300 uses a single measurement channel and a single microcontroller to receive and process sensor signals from a plurality of different types of sensors (e.g., both capacitive and inductive sensors).

Controller 308 analyzes the received digital values representing the sensed capacitance and the sensed inductance to determine whether a child is present in a child safety seat containing the child detection device 300. In some examples, the signals from sensors 318 may be sensitive to temperature change, so controller 308 may use a baseline tracking method. If controller 308 determines based on the digital values that a child is present in the child safety seat, controller 308 may use wireless communication circuit 312 and antenna 304 to wirelessly transmit a child detected signal to a controller (e.g., controller 206 in FIG. 2). In an example, controller 206 is located outside of the container 302 and remotely from the child safety seat containing device 300, but within the automobile containing the child safety seat. In another example, controller 206 is located inside or outside the automobile containing the child safety seat and is part of a portable electronic device (e.g., cell phone) carried by a driver of the automobile.

As mentioned above, sensors 318 may include at least one capacitive sensor. Capacitive sensing involves electrical signals generated on electrodes that reflect changes in capacitance. Such changes in capacitance can indicate the proximity of an object to particular electrodes. A capacitive sensor may work by measuring the capacitance of a capacitive sense element, and looking for a delta in capacitance indicating contact or close proximity of a conductive object. When a conductive object (e.g., part of a human body) comes into contact or close proximity with a capacitive sense element, the capacitance changes and the conductive object is detected. The capacitance changes of capacitance sense elements can be measured by an electrical circuit.

There are two typical types of capacitance: (1) Mutual capacitance where the capacitance sensing circuit measures a capacitance formed between two electrodes of a capacitor (e.g., a transmit (Tx) electrode and a receive (Rx) electrode); and (2) self-capacitance where the capacitance sensing circuit measures a capacitance of one electrode of the capacitor. Excitation voltage signals may be sent from conversion circuit 310 to interconnect circuitry 314 and applied to a transmit electrode, and capacitive charges received from a receive electrode may be transferred through interconnect circuitry 314 to conversion circuit 310. The amount of charge received on the receive electrode is directly proportional to the mutual capacitance between the two electrodes. The conversion circuit 310 may convert the received capacitive charges to digital values, which may be processed by controller 308. For self-capacitive sensing, when a portion of the human body is present near the sensor, the conductive nature and large mass of the human body forms a grounded, conductive plane parallel to the sensor pad, and a parallel plate capacitor is formed.

In an example, child detection device 300 uses capacitive sigma delta (CSD) sensing using a switched capacitor technique and a delta-sigma modulator. In an example, the at least one capacitive sensor of sensors 318 may include a first set of capacitive sensors to measure mutual capacitance between two adjacent conductors, and a second set of capacitive sensors to measure self-capacitance between a conductor and ground. Experimental results have shown that the capacitance of a six month old baby to ground is about 10 pF, and that the self-capacitance and mutual capacitance signals for a child safety seat are about 1-2 pF. In an example, the capacitive sensors of sensors 318 have a size of about 2×2 cm to 20×20 cm. In other examples, other sizes may be used.

As mentioned above, sensors 318 may include at least one inductive sensor. Inductive sensors rely on electromagnetic induction, and may detect different types of objects than capacitive sensors. As a metal object approaches an inductive sensor, the magnetic field produced by the inductive sensor may induce an eddy current in the metal object that generates a magnetic field that opposes the sensor magnetic field and changes the inductance measurement. The inductance signals may be used to help distinguish between a human and a non-human object.

In some examples, sensors 318 may include at least one hybrid sensor that combines inductive and capacitive sensing. For example, the hybrid sensor may use capacitive sensing in a first mode and inductive sensing in a second mode. In an example, sensors 318 measure capacitance and inductance at a predetermined measurement interval, such as once every 10 seconds.

Figure 4:
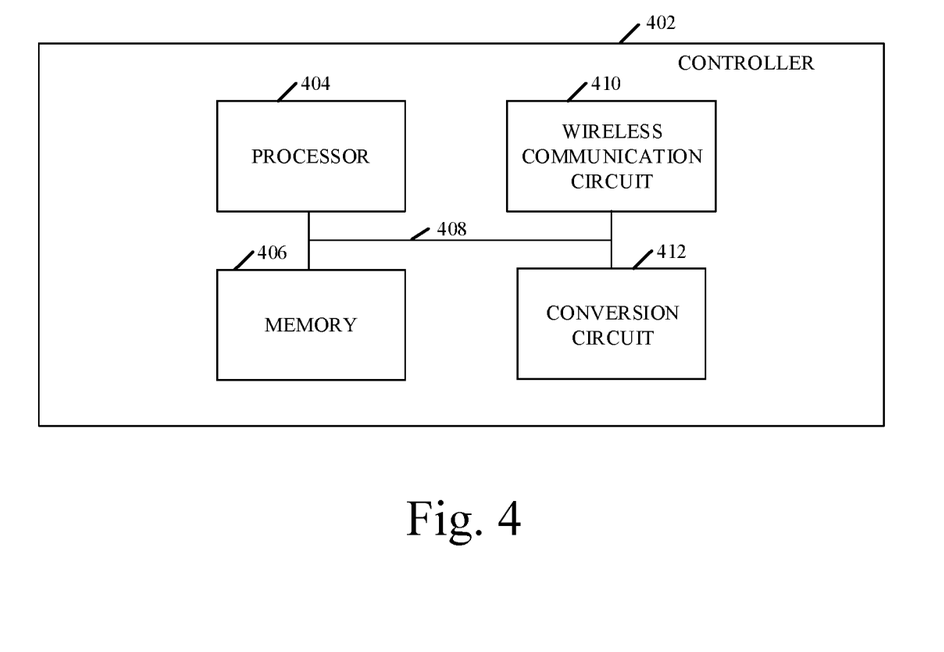
FIG. 4 is block diagram illustrating elements of a controller according to an example.

FIG. 4 is a block diagram illustrating elements of a controller 402 according to an example. Any of the controllers disclosed herein, such as controller 206 (FIG. 2) or controller 308 (FIG. 3), may be implemented as shown in FIG. 4. In an example, controller 402 is a microcontroller system that may include application-specific integrated circuits (ASICs), field-programmable gate arrays (FPGAs), application processors, digital signal processors (DSPs), networking controllers, video and audio controllers, graphics processing units, digital components such as timers and input/outputs ("I/Os"), analog components such as analog-to-digital converters ("ADC") and analog comparators, communication interfaces, clock sources such as a crystal oscillator, timers such as a real time clock ("RTC"), and the like.

Among other components (not shown in FIG. 4), controller 402 includes processor 404, memory 406, wireless communication circuit 410, and conversion circuit 412. Wireless communication circuit 410 is an example of wireless communication circuit 312 (FIG. 3). Conversion circuit 412 is an example of conversion circuit 310 (FIG. 1). Conversion circuit 412 performs various conversions (e.g., analog-to-digital and digital-to-analog) to facilitate communication between processor 404 and sensors coupled to controller 402 (e.g., sensors 318 shown in FIG. 3).

In the illustrated example, processor 404, memory 406, wireless communication circuit 410, and conversion circuit 412 are communicatively coupled to each other via communication link 408, which may be an internal communication bus. It is noted that various implementations and embodiments may use different components or combinations of components to perform the operations described herein.

Processor 404 includes a central processing unit (CPU) or another suitable processor. In one example, memory 406 stores machine readable instructions executed by processor 404 for operating the controller 402. Memory 406 includes any suitable combination of volatile and/or non-volatile memory, such as combinations of Random Access Memory (RAM), Read-Only Memory (ROM), flash memory, and/or other suitable memory. These are examples of non-transitory computer readable storage media. Memory 406 is non-transitory in the sense that it does not encompass a transitory signal but instead is made up of at least one memory component to store machine executable instructions for performing techniques described herein.

In an example, the various subcomponents or elements of the controller 402 may be embodied in a plurality of different systems, where different modules may be grouped or distributed across the plurality of different systems. To achieve its desired functionality. controller 402 may include various hardware components. Among these hardware components may be a number of processing devices, a number of data storage devices, a number of peripheral device adapters, and a number of network adapters. These hardware components may be interconnected through the use of a number of busses and/or network connections. The processing devices may include a hardware architecture to retrieve executable code from the data storage devices and execute the executable code. The executable code may, when executed by the processing devices, cause the processing devices to implement at least some of the functionality disclosed herein.

Figure 5:
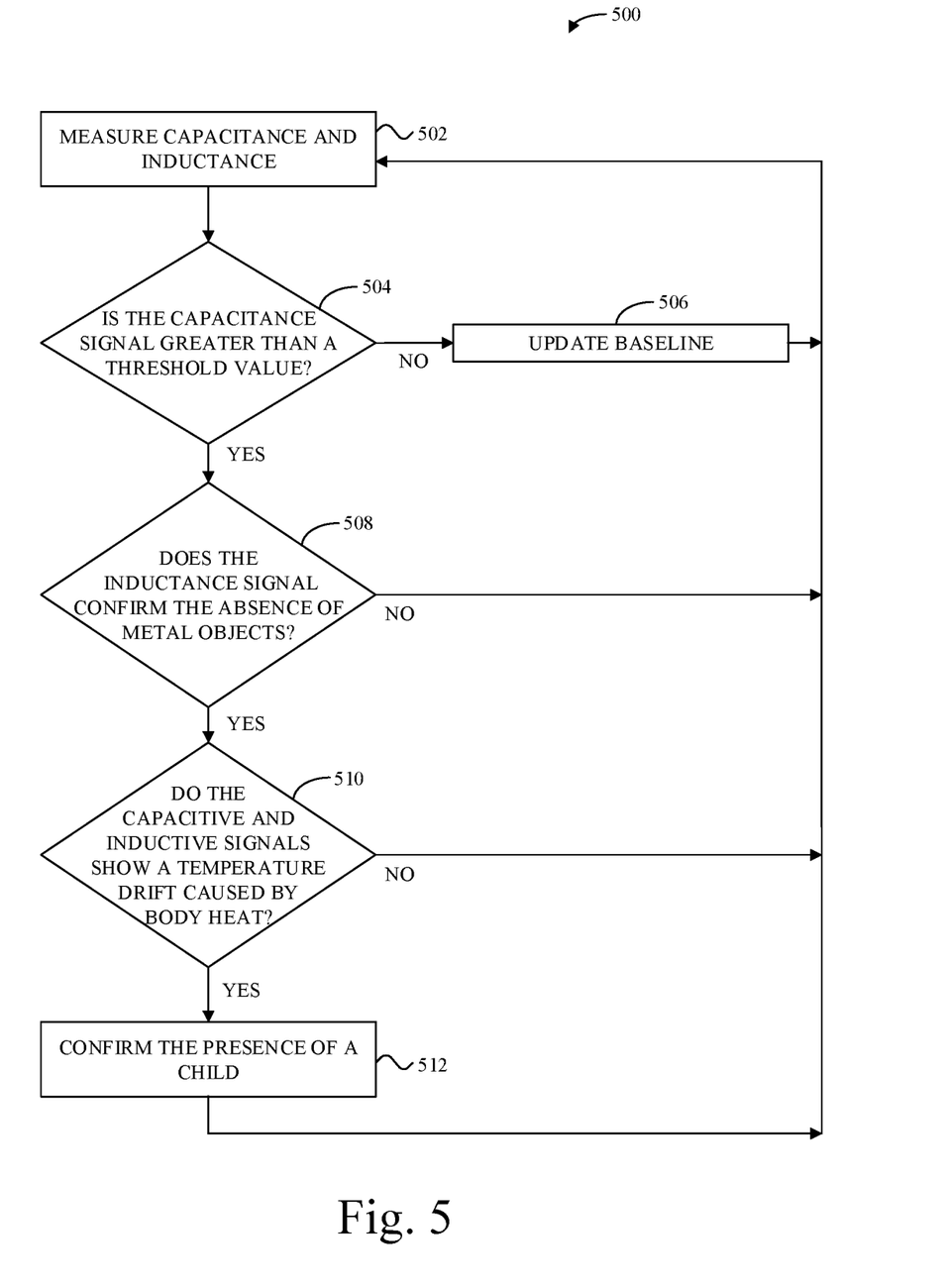
FIG. 5 is a flow diagram illustrating a method for determining whether a child is present in a child safety seat according to an example.

FIG. 5 is a flow diagram illustrating a method 500 for determining whether a child is present in a child safety seat according to an example. Method 500 may be performed by child detection device 300 (FIG. 3) while it is positioned in a child safety seat, such as child safety seat 100 (FIG. 1). At 502 in method 500, child detection device 300 performs a capacitance and inductance measurement using sensors 318. The capacitance measured at 502 may be a self-capacitance, a mutual capacitance, or both.

At 504 in method 500, controller 308 determines whether the capacitance signal is greater than a threshold value. In an example, the capacitance signal at 504 may be a difference signal value representing the difference between the capacitance signal measured at 504 and a reference or baseline signal value. If the difference signal value is greater than the threshold value, which indicates that an object is in close proximity to the capacitance sensor, the method 500 moves to 508. If the difference signal value is not greater than the threshold value, which indicates that an object is not in close proximity to the capacitance sensor, the method 500 moves to 506, where the baseline signal value is updated based on the capacitance signal measured at 504, and the method 500 returns to 502.

At 508 in method 500, controller 308 determines whether the inductance signal confirms the absence of metal objects. In an example, the inductance signal at 508 may be a difference signal value representing the difference between the inductance signal measured at 504 and a reference or baseline signal value. If the difference signal value is greater than the threshold value, which indicates that a metal object is in close proximity to the inductance sensor, the method 500 returns to 502. If the difference signal value is not greater than the threshold value, which indicates that a metal object is not in close proximity to the inductance sensor, the method 500 moves to 510.

At 510 in method 500, controller 308 determines whether the capacitive and inductive signals show a temperature drift caused by body heat of a child. If a child is present in a child safety seat containing child detection device 300, the body heat of the child will cause a change in temperature of the sensors 318. As the temperature of the sensors 318 changes, the signals from these sensors 318 will correspondingly drift. By monitoring the capacitive and inductive signals over time, the controller 308 may determine if these signals are drifting as a result of body heat of a child in close proximity to the sensors 318. If it is determined at 510 that the capacitive and inductive signals do not show a temperature drift caused by body heat, the method 500 returns to 502. If it is determined at 510 that the capacitive and inductive signals show a temperature drift caused by body heat, the method 500 moves to 512.

At 512 in method 500, controller 308 confirms the presence of a child in the child safety seat, and the method 500 returns to 502. After the controller 308 has confirmed the presence of a child in the child safety seat, the controller 308 may take additional actions to notify the driver and/or other occupants of the automobile of the child's presence. For example, the controller 308 may cause the wireless communication circuit 312 to wirelessly transmit a child detected signal via antenna 304 that indicates that a child is present in the child safety seat, which causes the automobile to produce an audible and/or visual notification to indicate to the driver that a child is present in the child safety seat.

In some examples, controller 308 identifies movement of an object in close proximity to sensors 318 by monitoring the capacitive and inductive signals produced by these sensors over time. The identification of movement by controller 308 may be used to help the controller 308 determine whether a child is present in the child safety seat. For example, if the sensors 318 include two capacitive sensors at known locations on the child safety seat, and a child moves away from a first one of the capacitive sensors and closer to a second one of the capacitive sensors, the decreasing signal of the first sensor and the increasing signal of the second sensor is indicative of the movement. Controller 308 identifies such movements based on the changes in the sensor signals over time, and uses the identified movements to determine that a child, rather than a static, non-human object, is present in the child safety seat.

An example of the present disclosure is directed to a child detection device for a child safety seat for an automobile. The child detection device includes a plurality of sensors to be positioned on the child safety seat, wherein the plurality of sensors includes at least one capacitive sensor to generate analog capacitive signals. The child detection device includes a conversion circuit to convert the analog capacitive signals to digital capacitive values. The child detection device includes a controller to identify movement of an object based on the digital capacitive values, and determine whether a child is positioned in the child safety seat based on the digital capacitive values and the identified movement.

The plurality of sensors of the child detection device may include at least two capacitive sensors to generate the analog capacitive signals. The at least two capacitive sensors may include a first capacitive sensor to sense self-capacitance signals and a second capacitive sensor to sense mutual capacitance signals.

The plurality of sensors of the child detection device may include at least one inductive sensor to generate analog inductive signals. The conversion circuit of the child detection device may convert the analog inductive signals to digital inductive values, and the controller may determine whether a child is positioned in the child safety seat based on the digital capacitive values, the digital inductive values, and the identified movement.

The controller of the child detection device may identify whether the digital capacitive values indicate a temperature drift, and determine whether a child is positioned in the child safety seat based on the digital capacitive values, the identified movements, and the identification of whether the digital capacitive values indicate a temperature drift.

The plurality of sensors of the child detection device may include at least one sensor to be positioned on a seating area of the child safety seat and at least one additional sensor to be positioned on a backrest area of the child safety seat. The conversion circuit and the controller may be positioned on the child safety seat.

The child detection device may include a wireless communication circuit to wirelessly transmit a child present indication to a control circuit of an automobile containing the child safety seat that causes the control circuit to generate an audible or visual notification indicating that a child is present in the child safety seat. The plurality of sensors, the conversion circuit, the controller, and the wireless communication circuit may be implemented in a common container to be positioned on the child safety seat.

Another example of the present disclosure is directed to an automotive system for an automobile. The automotive system includes a plurality of sensors to be positioned in close proximity to a child safety seat in the automobile, wherein the plurality of sensors includes at least one capacitive sensor to generate analog capacitive signals. The automotive system includes a conversion circuit to convert the analog capacitive signals to digital capacitive values. The automotive system includes a controller to identify movement of an object in close proximity to the child safety seat based on the digital capacitive values, and determine whether a child is positioned in the child safety seat based on the digital capacitive values and the identified movement. The automotive system includes a control circuit in the automobile to wirelessly receive a child present indication from the controller indicating that a child is present in the child safety seat and to cause in response an audible or visual notification to be generated in the automobile.

The plurality of sensors of the automotive system may include a first capacitive sensor to sense self-capacitance signals and a second capacitive sensor to sense mutual capacitance signals. The plurality of sensors of the automotive system may include at least one inductive sensor to generate analog inductive signals, wherein the conversion circuit is to convert the analog inductive signals to digital inductive values, and wherein the controller is to determine whether a child is positioned in the child safety seat based on the digital capacitive values, the digital inductive values, and the identified movement.

The controller of the automotive system may identify whether the digital capacitive values indicate a temperature drift, and determine whether a child is positioned in the child safety seat based on the digital capacitive values, the identified movement, and the identification of whether the digital capacitive values indicate a temperature drift. The automotive system may include a wireless communication circuit to wirelessly transmit the child present indication to the control circuit, wherein the plurality of sensors, the conversion circuit, the controller, and the wireless communication circuit are implemented in a common container to be positioned on the child safety seat.

Figure 6:
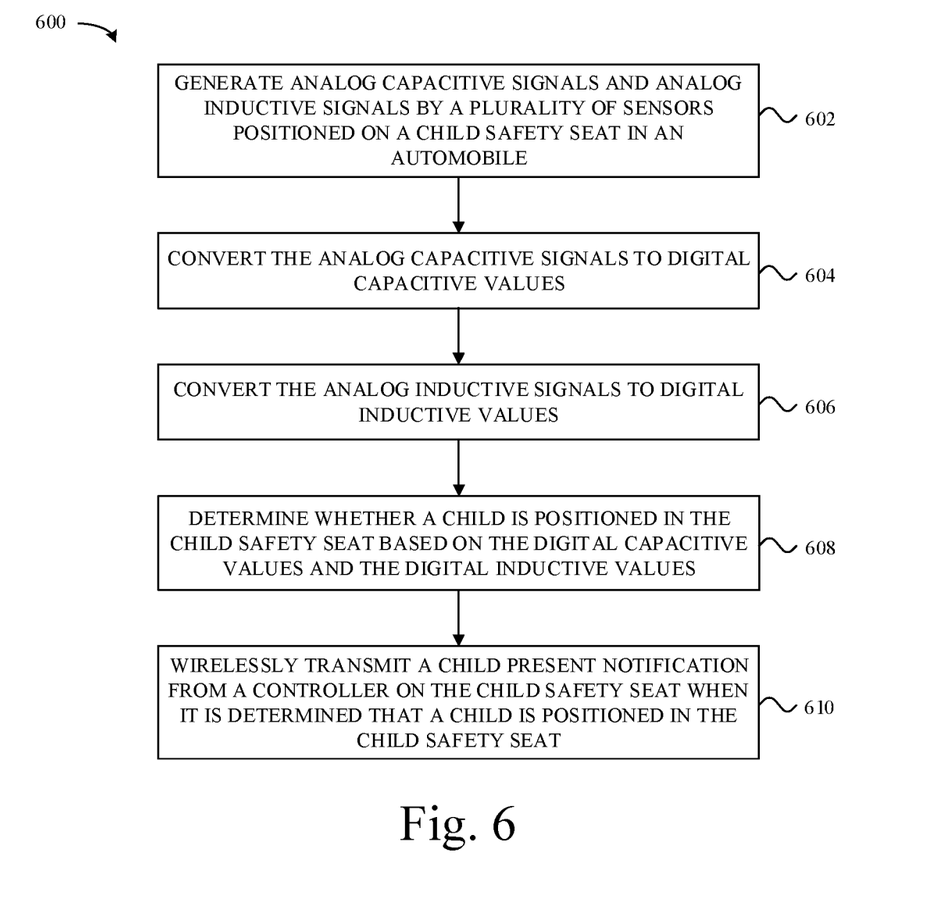
FIG. 6 is a flow diagram illustrating a method of detecting presence of a child according to an example.

Yet another example of the present disclosure is directed to a method of detecting presence of a child. FIG. 6 is a flow diagram illustrating a method 600 of detecting presence of a child according to an example. In an example, child detection device 300 (FIG. 3) is configured to perform method 600.

At 602 in method 600, analog capacitive signals and analog inductive signals are generated by a plurality of sensors positioned on a child safety seat in an automobile. At 604, the analog capacitive signals are converted to digital capacitive values. At 606, the analog inductive signals are converted to digital inductive values. At 608, it is determined whether a child is positioned in the child safety seat based on the digital capacitive values and the digital inductive values. At 610, a child present notification is wirelessly transmitted from a controller on the child safety seat when it is determined that a child is positioned in the child safety seat.

In some examples, the method 600 may further include generating a first set of the analog capacitive signals with a first capacitive sensor that senses self-capacitance signals; and generating a second set of the analog capacitive signals with a second capacitive sensor that senses mutual capacitance signals.

In some examples, the method 600 may further include identifying movement of an object based on the digital capacitive values; and determining whether a child is positioned in the child safety seat based on the digital capacitive values, the digital inductive values, and the identified movement.

In some examples, the method 600 may further include identifying whether the digital capacitive values indicate a temperature drift, and determining whether a child is positioned in the child safety seat based on the digital capacitive values, the digital inductive values, and the identification of whether the digital capacitive values indicate a temperature drift.

In some examples, the method 600 may further include wirelessly receiving the child present notification; and generating an audible or visual notification within the automobile in response to the received child present notification.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A child detection device for a child safety seat for an automobile, comprising:
    a plurality of sensors to be positioned on the child safety seat, wherein the plurality of sensors includes at least one capacitive sensor to generate analog capacitive signals;
    a conversion circuit to convert the analog capacitive signals to digital capacitive values; and
    a controller to identify movement of an object based on the digital capacitive values, and determine whether a child is positioned in the child safety seat based on the digital capacitive values and the identified movement.

2. The child detection device of claim 1, wherein the plurality of sensors include at least two capacitive sensors to generate the analog capacitive signals.

3. The child detection device of claim 2, wherein the at least two capacitive sensors include a first capacitive sensor to sense self-capacitance signals and a second capacitive sensor to sense mutual capacitance signals.

4. The child detection device of claim 1, wherein the plurality of sensors include at least one inductive sensor to generate analog inductive signals.

5. The child detection device of claim 4, wherein the conversion circuit is to convert the analog inductive signals to digital inductive values, and wherein the controller is to determine whether a child is positioned in the child safety seat based on the digital capacitive values, the digital inductive values, and the identified movement.

6. The child detection device of claim 1, wherein the controller is to identify whether the digital capacitive values indicate a temperature drift, and determine whether a child is positioned in the child safety seat based on the digital capacitive values, the identified movements, and the identification of whether the digital capacitive values indicate a temperature drift.

7. The child detection device of claim 1, wherein the plurality of sensors include at least one sensor to be positioned on a seating area of the child safety seat and at least one additional sensor to be positioned on a backrest area of the child safety seat.

8. The child detection device of claim 1, wherein the conversion circuit and the controller are to be positioned on the child safety seat.

9. The child detection device of claim 1, and further comprising:
    a wireless communication circuit to wirelessly transmit a child present indication to a control circuit of an automobile containing the child safety seat that causes the control circuit to generate an audible or visual notification indicating that a child is present in the child safety seat.

10. The child detection device of claim 9, wherein the plurality of sensors, the conversion circuit, the controller, and the wireless communication circuit are implemented in a common container to be positioned on the child safety seat.

11. An automotive system for an automobile, comprising:
    a plurality of sensors to be positioned in close proximity to a child safety seat in the automobile, wherein the plurality of sensors includes at least one capacitive sensor to generate analog capacitive signals;
    a conversion circuit to convert the analog capacitive signals to digital capacitive values;
    a controller to identify movement of an object in close proximity to the child safety seat based on the digital capacitive values, and determine whether a child is positioned in the child safety seat based on the digital capacitive values and the identified movement; and
    a control circuit in the automobile to wirelessly receive a child present indication from the controller indicating that a child is present in the child safety seat and to cause in response an audible or visual notification to be generated in the automobile.

12. The automotive system of claim 11, wherein the plurality of sensors include a first capacitive sensor to sense self-capacitance signals and a second capacitive sensor to sense mutual capacitance signals.

13. The automotive system of claim 11, wherein the plurality of sensors include at least one inductive sensor to generate analog inductive signals, wherein the conversion circuit is to convert the analog inductive signals to digital inductive values, and wherein the controller is to determine whether a child is positioned in the child safety seat based on the digital capacitive values, the digital inductive values, and the identified movement.

14. The automotive system of claim 11, wherein the controller is to identify whether the digital capacitive values indicate a temperature drift, and determine whether a child is positioned in the child safety seat based on the digital capacitive values, the identified movement, and the identification of whether the digital capacitive values indicate a temperature drift.

15. The automotive system of claim 11, and further comprising:
a wireless communication circuit to wirelessly transmit the child present indication to the control circuit, wherein the plurality of sensors, the conversion circuit, the controller, and the wireless communication circuit are implemented in a common container to be positioned on the child safety seat.

16. A method, comprising:
generating analog capacitive signals and analog inductive signals by a plurality of sensors positioned on a child safety seat in an automobile;
converting the analog capacitive signals to digital capacitive values;
converting the analog inductive signals to digital inductive values;
determining whether a child is positioned in the child safety seat based on the digital capacitive values and the digital inductive values; and
wirelessly transmitting a child present notification from a controller on the child safety seat when it is determined that a child is positioned in the child safety seat.

17. The method of claim 16, and further comprising:
generating a first set of the analog capacitive signals with a first capacitive sensor that senses self-capacitance signals; and
generating a second set of the analog capacitive signals with a second capacitive sensor that senses mutual capacitance signals.

18. The method of claim 16, and further comprising:
identifying movement of an object based on the digital capacitive values; and
determining whether a child is positioned in the child safety seat based on the digital capacitive values, the digital inductive values, and the identified movement.

19. The method of claim 16, and further comprising:
identifying whether the digital capacitive values indicate a temperature drift, and
determining whether a child is positioned in the child safety seat based on the digital capacitive values, the digital inductive values, and the identification of whether the digital capacitive values indicate a temperature drift.

20. The method of claim 16, and further comprising:
wirelessly receiving the child present notification; and
generating an audible or visual notification within the automobile in response to the received child present notification.

* * * * *